«12» United States Patent
Susarla et al.

(10) Patent No.: US 9,830,097 B2
(45) Date of Patent: Nov. 28, 2017

(54) APPLICATION-SPECIFIC CHUNK-ALIGNED PREFETCH FOR SEQUENTIAL WORKLOADS

(71) Applicant: NetApp, Inc., Sunnyvale, CA (US)

(72) Inventors: Sai Susarla, Bangalore (IN); Sandeep Ummadi, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 28 days.

(21) Appl. No.: 15/042,945

(22) Filed: Feb. 12, 2016

(65) Prior Publication Data
US 2017/0235504 A1 Aug. 17, 2017

(51) Int. Cl.
G06F 12/00 (2006.01)
G06F 3/06 (2006.01)

(52) U.S. Cl.
CPC .......... G06F 3/0619 (2013.01); G06F 3/067 (2013.01); G06F 3/0653 (2013.01); G06F 3/0659 (2013.01); G06F 3/0685 (2013.01)

(58) Field of Classification Search
CPC .. G06F 3/0613; G06F 12/0607; G06F 3/0653; G06F 3/0685; G06F 12/023; G06F 2212/1044
See application file for complete search history.

(56) References Cited

U.S. PATENT DOCUMENTS

| 6,442,682 B1* | 8/2002 | Pothapragada | ... G06F 17/30067 707/E17.01 |
| 2008/0008202 A1* | 1/2008 | Terrell | ............... H04L 12/5693 370/401 |
| 2008/0229027 A1* | 9/2008 | Shioya | ............... G06F 12/0862 711/137 |
| 2009/0125632 A1* | 5/2009 | Purpura | ................. H04L 63/10 709/229 |
| 2009/0235029 A1* | 9/2009 | Mouton | ............ G06F 12/0864 711/128 |
| 2011/0029732 A1* | 2/2011 | Kobayashi | ............. G06F 3/061 711/114 |
| 2014/0052928 A1* | 2/2014 | Shimoi | .............. G06F 12/0862 711/137 |

* cited by examiner

Primary Examiner — Yaima Rigol
Assistant Examiner — Tasnima Matin
(74) Attorney, Agent, or Firm — Haynes and Boone, LLP

(57) ABSTRACT

A method, a computing device, and a non-transitory machine-readable medium for identifying a set of transactions directed to a contiguous chunk of data, even if received out of order, determining the data chunk size from the set of transactions, and for sequentially retrieving data chunks using the data chunk size is provided. In some embodiments, the method includes receiving, by a storage system, a set of data transactions from an initiator. The storage system identifies a subset of the set of data transactions that is directed to accessing a first chunk of data and determines, from the subset of transactions, a chunk size of the first chunk of data. The storage system sequentially retrieves a second chunk of data based on the determined chunk size.

20 Claims, 7 Drawing Sheets

| Transaction ID 502 | Initiator ID 504 | Volume ID 506 | R/W/O 508 | Timestamp 510 | LBA ID 512 | LBA Shift 514 |
|---|---|---|---|---|---|---|
| 0000001 | --- | --- | --- | --- | --- | --- |
| 0000002 | --- | --- | --- | --- | --- | --- |
| 0000003 | --- | --- | --- | --- | --- | --- |
| 0000004 | --- | --- | --- | --- | --- | --- |
| 0000005 | --- | --- | --- | --- | --- | --- |
| 0000006 | --- | --- | --- | --- | --- | --- |
| 0000007 | --- | --- | --- | --- | --- | --- |
| 0000008 | | | | | | |

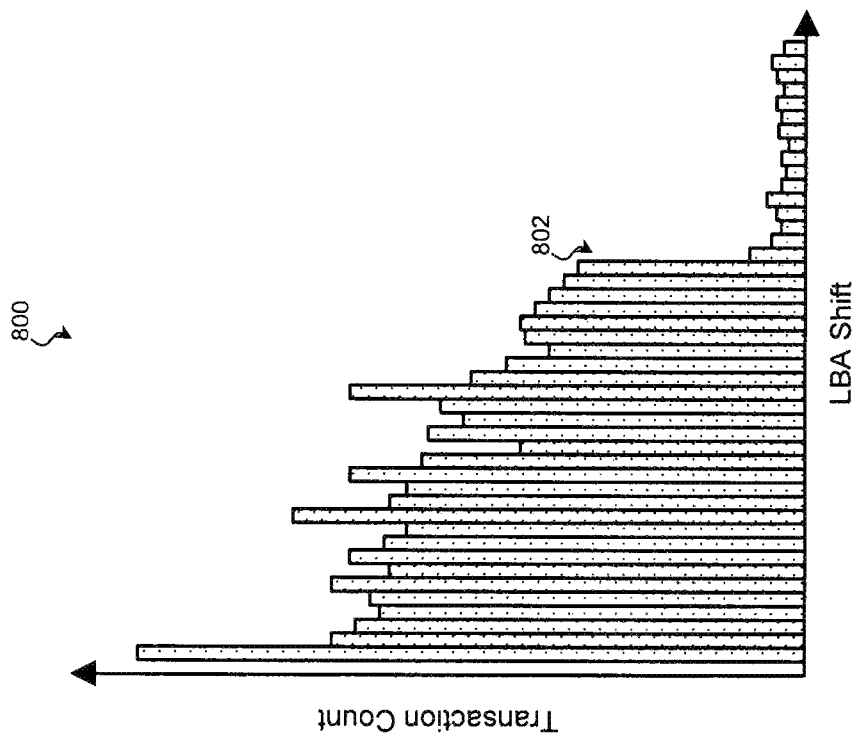
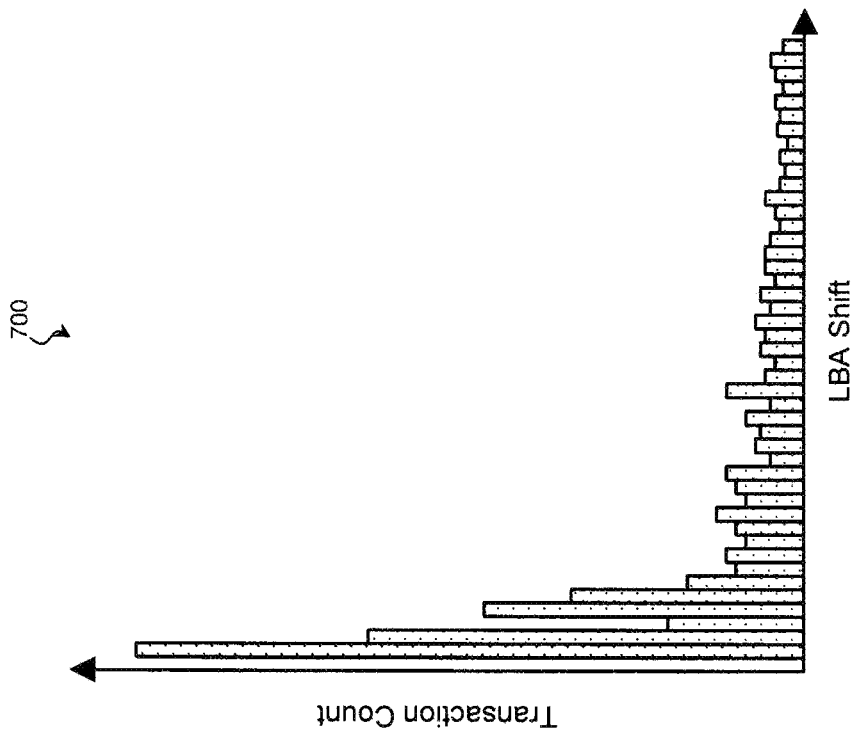

APPLICATION-SPECIFIC CHUNK-ALIGNED PREFETCH FOR SEQUENTIAL WORKLOADS

TECHNICAL FIELD

The present description relates to data storage and retrieval, and more specifically, to a technique for detecting a set of sequential I/O requests that are received out of order, determining a data chunk size associated with the set, and prefetching data for the current and subsequent chunks based on the chunk size.

BACKGROUND

As processing power has increased and storage costs have fallen, applications have emerged to leverage this capacity to rapidly manipulate large quantities of data. For example, video editing applications may store read, write, and edit video files of several gigabytes or more. In fact, terabyte-sized datasets are not uncommon and may be used to manage organizations, to monitor logistics, to track and analyze customer behavior, and to perform scientific analysis ranging from physics simulations to oil and gas exploration. To support these applications and others, a storage architecture may incorporate Network Attached Storage (NAS) devices, Storage Area Network (SAN) devices, and other configurations of storage elements and controllers that interface with any number and manner of storage devices.

In many cases, it is the storage devices themselves that are the limiting factor in performance. Magnetic hard disk drives (HDD) have high capacities and are affordable, but often have latencies that are an order of magnitude greater than the next fastest technology. The nature of rotating platters and seeking heads means that random read/write performance is particularly slow. To improve storage performance in light of these limitations, the HDDs may be incorporated into a heterogeneous collection of storage devices arranged in a cache hierarchy. A cache hierarchy dynamically maps subsets of the address space to smaller pools of faster devices, so that data may be read from and written to the faster devices as frequently as possible.

The caches may be loaded with data when transactions request it and may also be loaded by prefetch operations that attempt to predict what data will be used next. A number of techniques exist for determining which data to load into which particular cache. However, when a workload is variable or random, conventional caching algorithms may not make accurate prefetch predictions, which hurts cache efficiency and performance. Accordingly, while conventional prefetching techniques have been generally adequate, an efficient system and method for improved prefetching has the potential to dramatically improve cache hit rate and system performance.

BRIEF DESCRIPTION OF THE DRAWINGS

The present disclosure is best understood from the following detailed description when read with the accompanying figures.

FIG. 5 is a memory diagram of a transaction log according to aspects of the present disclosure.

FIG. 7 is a histogram of logical block address (LBA) shift values for an exemplary set of transactions during a baseline window according to aspects of the present disclosure.

FIG. 8 is a histogram of LBA shift values for an exemplary set of transactions during a chunk access according to aspects of the present disclosure.

DETAILED DESCRIPTION

Figure 1:
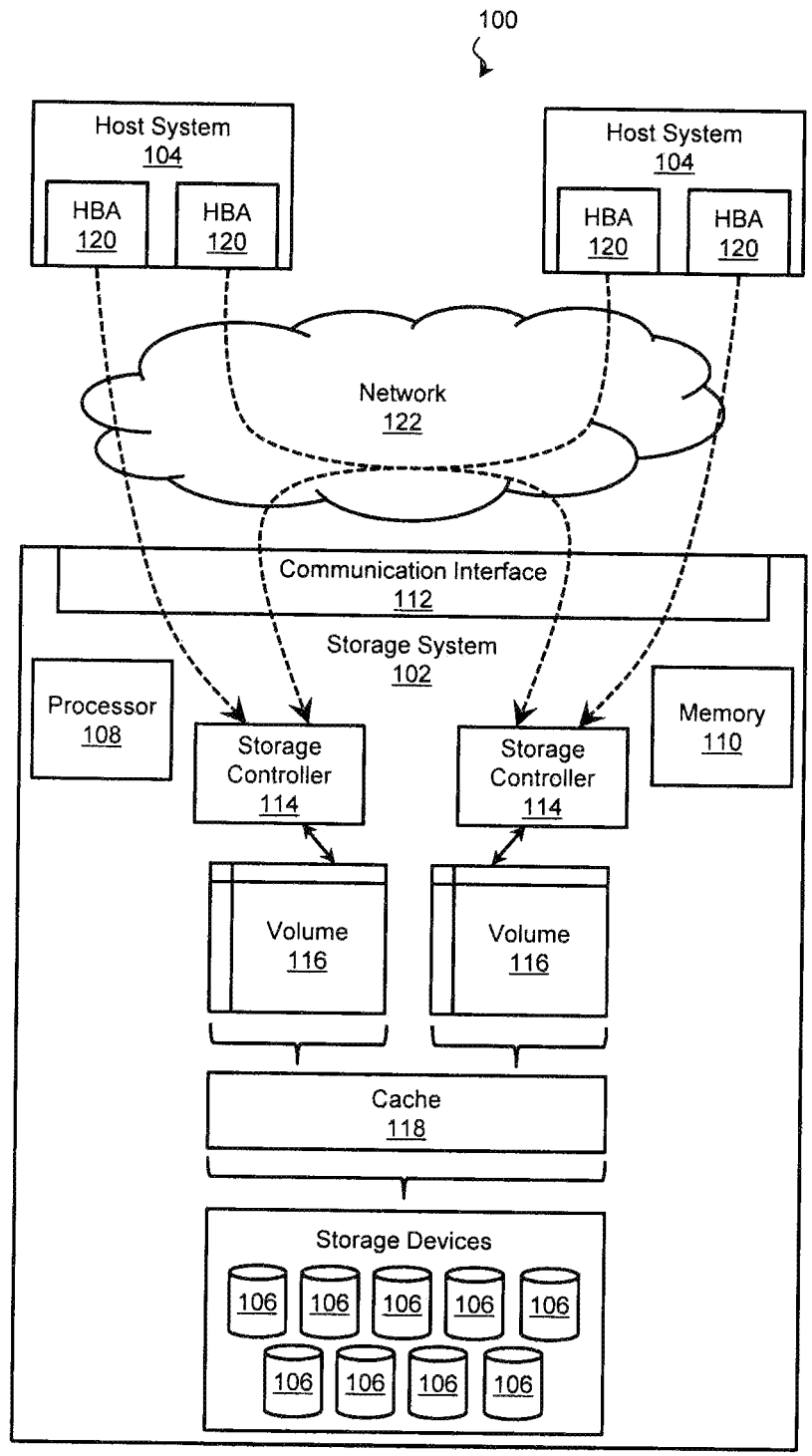
FIG. 1 is an organizational diagram of a data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for detecting when a set of data transactions constitute an access of an entire contiguous data chunk, even when the transactions are out of order and lack context, and for using attributes of the data chunk to improve chunk access and prefetching. In an exemplary embodiment, a storage system receives a set of data transactions from an initiator that are directed to a volume. A storage controller or other entity of the storage system examines the received data transactions in an attempt to identify a subset that is an attempt to access a single chunk of data in its entirety. The transactions of the subset may all be received at similar times, but there is no guarantee that they are received in order or that they are clearly identifiable. Accordingly, they may not be recognized as anything other than random transactions by conventional prefetch algorithms.

In order to identify the subset directed to the data chunk, the storage controller may establish a baseline for transaction activity at a time when few transactions are received and use the baseline to identify periods of high activity. Because the transactions directed to the chunk may be received in rapid succession, the periods of high activity may indicate requests to access an entire data chunk. The logical block address (LBA) shifts of the transactions received during these periods of high activity are compared to the LBA shifts of the transactions during the baseline time. Because a set of transactions directed to a single chunk will have LBA shifts less than or equal to the chunk size, the storage controller may look for upper bounds or rapid drop offs in LBA shift values and other statistical signifiers of the chunk size.

Once the chunk size is determined, the storage system may use it to improve performance for subsequent data transactions. For example in some embodiments, the storage system begins to prefetch an entire chunk when the first few transactions directed to the chunk are received. Not only does this improve performance by beginning subsequent transaction before they are received, but for some storage media such as magnetic hard disks, the storage system can retrieve and cache the entire chunk much faster using a single sequential read than using a set of random accesses. Furthermore, the storage system may prefetch subsequent chunks in response to transactions directed to a preceding chunk. This allows retrieval to begin before the next chunk is requested by the initiator. Of course, these advantages of the present technique are merely exemplary, and no particular advantage is required for any particular embodiment.

FIG. 1 is an organizational diagram of a data storage architecture 100 according to aspects of the present disclosure. The data storage architecture 100 includes a storage system 102 that processes data transactions on behalf of other computing systems including one or more hosts 104. It is understood that for clarity and ease of explanation, only a single storage system 102 and a limited number of hosts 104 are illustrated, although the data storage architecture 100 may include any number of hosts 104 in communication with any number of storage systems 102. An exemplary storage system 102 receives data transactions (e.g., requests to read and/or write data) from the hosts 104 and takes an action such as reading, writing, or otherwise accessing the requested data so that storage devices 106 of the storage system 102 appear to be directly connected (local) to the hosts 104. This allows an application running on a host 104 to issue transactions directed to storage devices 106 of the storage system 102 and thereby access data on the storage system 102 as easily as it can access data on the storage devices 106 of the host 104.

While the storage system 102 and the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor 108 such as a microcontroller or a central processing unit (CPU) operable to perform various computing instructions. The computing system may also include a memory device 110 such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface 112 such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 in communication with one or more storage controllers 114. The storage devices 106 of the storage system 102 may include hard disk drives (HDDs), solid state drives (SSDs), RAM drives, optical drives, and/or any other suitable volatile or non-volatile data storage medium. The storage controllers 114 exercise low-level control over the storage devices 106 in order to execute (perform) data transactions on behalf of the hosts 104, and in so doing, may group the storage devices for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 104. In this way, the storage system 102 represents the group of devices as a single device, often referred to as a volume 116. Thus, a host 104 can access the volume 116 without concern for how it is distributed among the underlying storage devices 106.

The storage controllers 114 may also be in communication with a cache 118 configured to cache data on behalf of the storage devices 106. Typically, faster devices are used in higher tiers of a memory structure, and accordingly in one embodiment, the storage devices 106 includes a plurality of HDDs arranged in a Redundant Array of Independent Disks (RAID) configuration, whereas the cache 118 includes a plurality of solid state drives (SSDs) and/or random-access memory configured as a RAM disk. In a further embodiment, the storage devices 106 includes a number of RAID HDDs, while the cache 118 includes a RAM disk as a level 1 cache and a number of SSDs as a level 2 cache. Of course, these configurations are merely exemplary, and the storage devices 106 and the cache 118 may each include any suitable storage device or devices in keeping with the scope and spirit of the present disclosure.

Turning now to the hosts 104, a host 104 includes any computing resource that is operable to exchange data with a storage system 102 by providing (initiating) data transactions to the storage system 102. In an exemplary embodiment, a host 104 includes a host bus adapter (HBA) 120 in communication with a storage controller 114 of the storage system 102. The HBA 120 provides an interface for communicating with the storage controller 114, and in that regard, may conform to any suitable hardware and/or software protocol. In various embodiments, the HBAs 120 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 120 are coupled to the storage system 102 via a network 122, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 120 of a host 104 sends one or more data transactions to the storage system 102 via the network 122. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Figure 2:
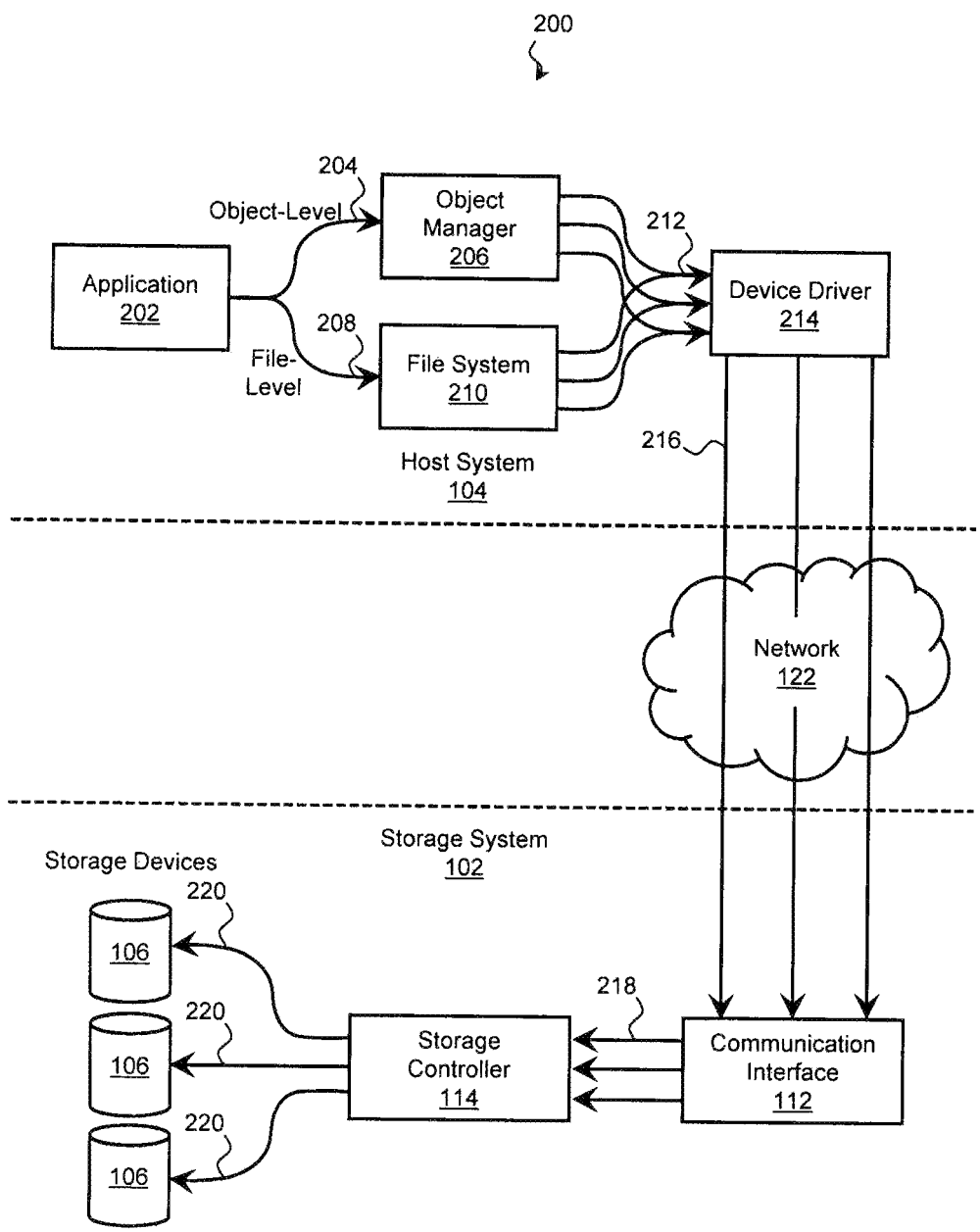
FIG. 2 is a schematic diagram of a host/storage system interface according to aspects of the present disclosure.

As explained above, applications running on the hosts 104 may access data stored on the storage system 102 in the same manner that data is accessed on the hosts' own local storage devices. FIG. 2 is a schematic diagram of a host/storage system interface 200 according to aspects of the present disclosure. The host/storage system interface 200 includes those components involved in communication between a host 104 and a storage system 102 each substantially as described above.

In order to access data, an application 202 running on the host 104 may request to read, write, or otherwise access data by providing an object-level data transaction 204 to an object manager 206 or a file-level data transaction 208 to a file system 210. In response, the object manager 206 or file system 210 may provide a set of block-level transactions 212 based on the object-level transaction 204 or file-level transaction 208 provided by the application 202.

In brief, block-level data transactions refer to data using an address that corresponds to a sector of a storage device and may include a physical address (i.e., an address that directly map to a storage device) and/or a logical address (i.e., an address that is translated into a physical, address of a storage device). Exemplary block-level protocols include Fibre Channel, SCSI, SATA, iSCSI, and Fibre Channel over Ethernet (FCoE).

As an alternative to block-level protocols, file-level protocols specify data locations by a file name. A file name is an identifier within a file system that can be used to uniquely identify corresponding memory addresses. File-level protocols utilize a file system component 210 to translate the file name into respective block-level addresses. Exemplary file-level protocols include CIFS/SMB, SAMBA, and NFS. Accordingly, a file-level application 202 may rely on the file system 210 to translate their file-level transactions into block-level transactions.

Object-level protocols are similar to file-level protocols in that data is specified via an object identifier that is eventually translated by an object manager 206 into a block-level address. However, objects are more flexible groupings of data and may specify a cluster of data within a file or spread across multiple files. Object-level protocols include CDMI, HTTP, SWIFT, and S3. In that regard, object-level applications 202 may rely on the object manager 206 to translate their object-level transactions into block-level transactions.

The set of block-level transactions 212 created by the object manager 206 or file system 210 may be provided to a device driver 214 of the host 104. In various embodiments, the host 104 contains any number of device drivers 214 corresponding to local storage devices, remote storage devices, peripherals, and other components. The device drivers 214 may be memory mapped and may each have a designated memory address range. Block-level transactions 212 may be routed to the appropriate device driver 214 based in part on the address contained within the transaction. In the illustrated example, the block-level transactions 212 are provided to the device driver 214 designated for communication with the storage system 102. Accordingly, in the example, the device driver 214 converts the set of block-level transactions 212 into a set of network transactions 216 that are provided over a network 122 that is substantially similar to that described above.

On the other side of the network, the network transactions 216 may be received by a communication interface 112 or other component of the storage system 102. In response to the network transactions, the communication interface 112 may generate another set of block-level transactions 218 directed to a particular volume 116. This set of block-level transactions 218 may be provided to a storage, controller 114 associated with the volume 116 to which the block-level transactions 218 are directed. The storage controller 114 may convert the virtual block addresses of the block-level transactions 218 received from the communication interface 112 into physical-level block addresses, may construct a different set of block-level transactions 220 using the physical-level addresses, and may provide them to the appropriate cache and/or storage devices 106.

It has been determined through observation and experimentation, that a single file-level or object-level data transaction 204 provided by the application 202 may be split into multiple parallel transactions at numerous stages throughout this flow. For example, an object manager 206 may create a plurality of parallel block-level transactions 212 from a single object-level transaction, or a file system 210 may create a plurality of parallel block-level transactions 212 from a single file-level transaction. Likewise a device driver 214 may create a plurality of parallel network transactions 216 from a single block-level transaction 212. In any event, the parallel transactions may not necessarily reference each other, and accordingly, context may be lost along the way.

However, it may be beneficial for the storage controller 114 of the storage system 102 to be able to reconstruct this context. One particular performance consideration is that magnetic spinning platter hard disk drives (HDD) and other magnetic media may have markedly better sequential read and write performance than random read and write performance. Sequential transactions access data in monotonically ascending order of address, and on a spinning platter device may be performed with minimal head seeking. This often delivers the best performance with the least latency between transactions. Therefore, it may be beneficial for the storage controller 114 to recognize that a set of seemingly random data transaction are actually part of a larger transaction that may be serviced sequentially rather than just responding to each transaction in isolation as it is received. This may also allow the storage controller 114 to prefetch data for the transactions that are still in flight before they are received.

It has also been determined that many applications request a large data set one chunk (i.e., a contiguous set of data of an arbitrary size) at a time and that applications may wait for a first data transaction to finish accessing a first chunk before issuing a second data transaction directed to the next chunk. For example, this behavior has been observed in Lustre® (a registered trademark of Seagate Technology, LLC) applications, Hadoop® (a registered trademark of Apache Software Foundation) applications, and others. Lustre® is a highly-parallelized file system for systems with high I/O bandwidth requirements and is found in many super-computing systems. Hadoop® is a framework for distributing data and processing tasks across clusters of systems and is well-suited for large database manipulation, video editing, scientific data analysis, and other computing tasks.

These types of applications may produce a burst of data transactions at the storage controller 114 interspersed with periods of low activity. To reduce latency, a storage controller 114 that recognizes that a set of seemingly random transactions constitutes an access of an entire chunk can use that information to access the chunk faster and to prefetch subsequent chunks.

Figure 3:
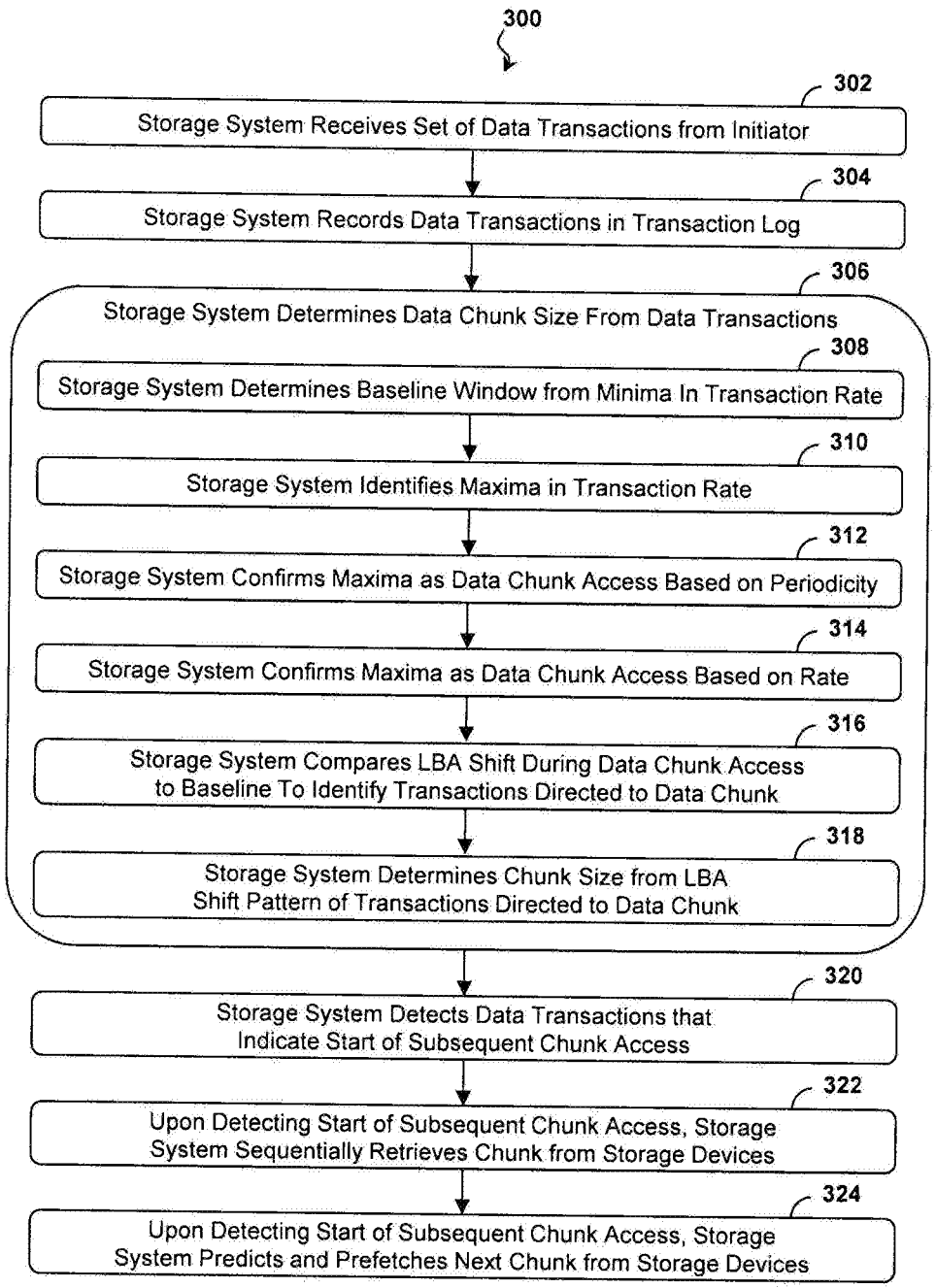
FIG. 3 is a flow diagram of a method of identifying transactions directed to a data chunk and for caching data according to aspects of the present disclosure.
Figure 4:
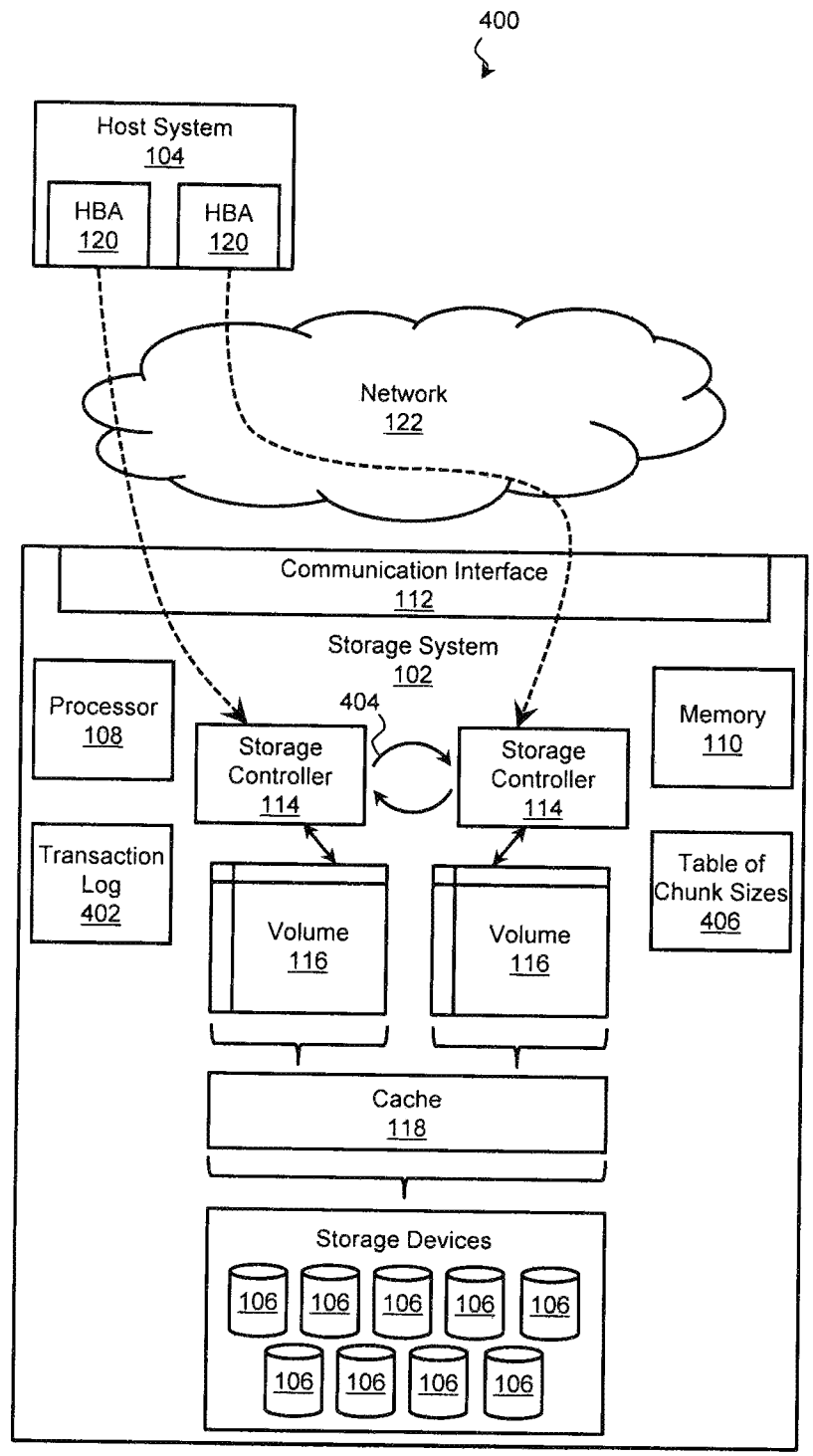
FIG. 4 is a schematic diagram of an exemplary storage architecture for performing the method according to aspects of the present disclosure.
Figure 6:
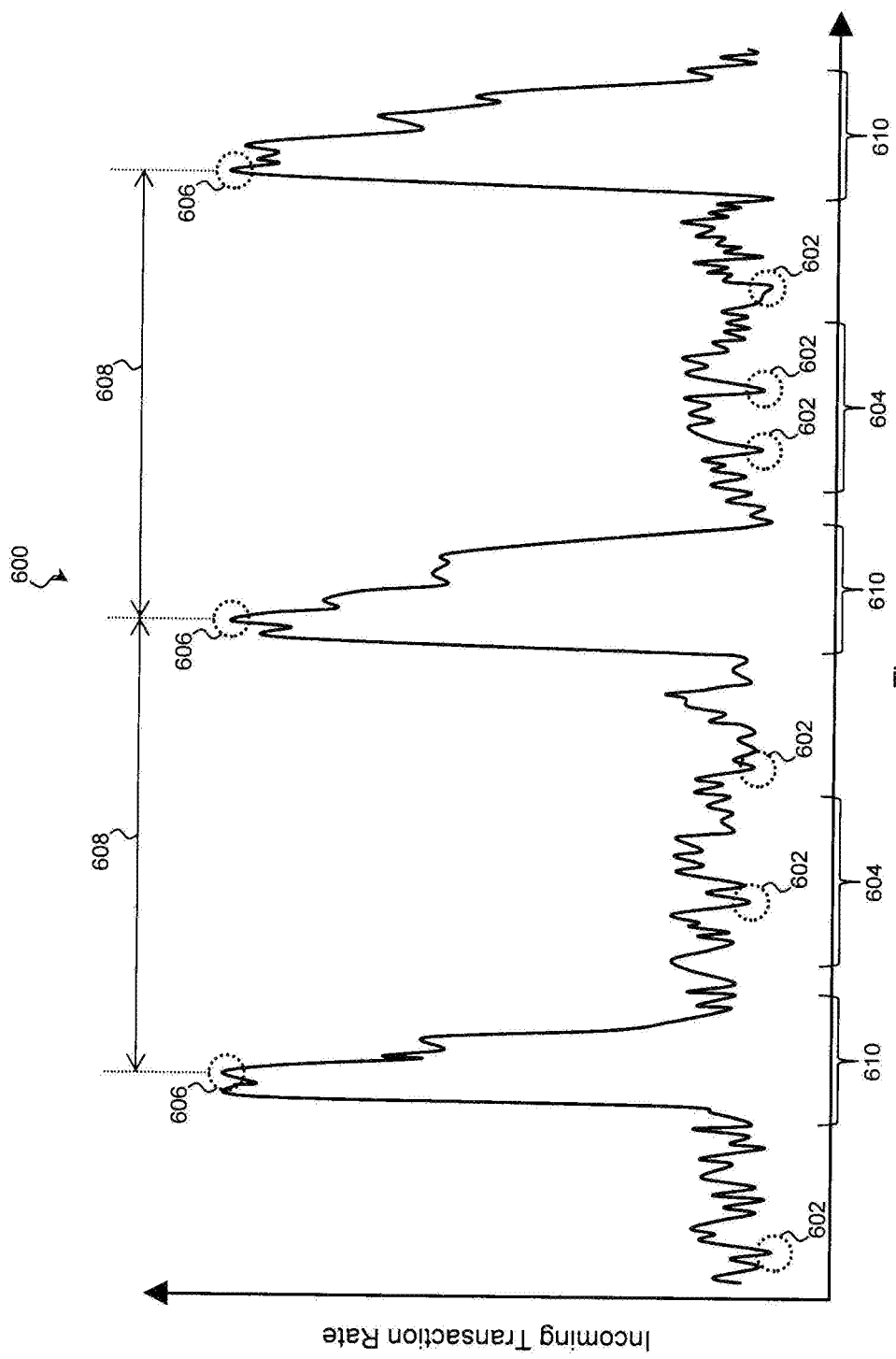
FIG. 6 is a plot of transactions received from an initiator over time in an example in accordance with aspects of the present disclosure.

A system and method for identifying such a set of transactions, for characterizing the chunk to which they are directed, and for caching the data accordingly is described with reference to FIGS. 3-8. FIG. 3 is a flow diagram of a method 300 of identifying transactions directed to a data chunk and for caching data according to aspects of the present disclosure. It is understood that additional steps can be provided before, during, and after the steps of method 300, and that some of the steps described can be replaced or eliminated for other embodiments of the method. FIG. 4 is a schematic diagram of an exemplary storage architecture 400 for performing the method 300 according to aspects of the present disclosure. The exemplary storage architecture 400 includes a host 104 and a storage system 102 in communication over network 122, each substantially similar to those described above. FIG. 5 is a memory diagram of a transaction log 402 according to aspects of the present disclosure. FIG. 6 is a plot 600 of transactions received from an initiator over time in an example in accordance with aspects of the present disclosure, FIGS. 7 and 8 are histograms of logical block address (LBA) shift values for exemplary sets of data transactions in an example in accordance with aspects of the present disclosure.

Referring first to block 302 of FIG. 3 and to FIG. 4, the storage system 102 (substantially as described above) receives a set of data transactions from an initiator. In a typical example, the initiator is one or more of the aforementioned hosts 104. In, a further example, the initiator is the storage system 102 itself, and the set of data transactions are generated from an application running on the storage system 102. In yet a further example, the initiator is a third party computing system.

Referring to block 304 of FIG. 3 and to FIG. 5, a storage controller 114 or other computing element of the storage system 102 records the incoming data transactions associated with the particular initiator to a transaction log 402. The transaction log 402 may record any suitable attribute of a transaction that may be useful in determining whether the transaction is part of a group that constitutes an access of an entire data chunk. An exemplary transaction log 402 is illustrated in FIG. 5 and in the illustrated embodiment, an entry 502 of the transaction log 402 records a number of attributes associated with a data transaction such as: a transaction ID 502, an initiator ID 504, a volume ID 506, a read/write/other identifier 508, a time received identifier 510, a logical block address (LBA) identifier 512, and/or an LBA shift value 514 representing the difference between the LBA associated with the current transaction and the LBA associated with the transaction received immediately before the current transaction. The transaction log 402 may be maintained in any suitable representation including a linked list, a tree, a table such as a hash table, an associative array, a state table, a flat file, a relational database, and/or other memory structure.

As data chunks seldom span volumes, the storage controller 114 may group the incoming data transactions by the volume to which they are directed. When an initiator (e.g., a host 104) is coupled to a storage system 102 by more than one connection, the data transactions directed to a particular volume may be received at more than one storage controller 114. Accordingly, in some embodiments, the storage controller 114 that is the volume owner queries other storage controllers 114 of the storage system via, an inter-controller channel 404 in order to identify and record all the incoming data transactions from the initiator that are directed to the volume of interest.

Referring to block 306 of FIG. 3, the storage controller 114 or any other suitable element of the storage system 102 analyzes the incoming data transactions recorded in the transaction log 402 to determine a chunk size associated with the application running on the initiator. In that regard, each application may have one or more unique and independent chunk sizes, and accordingly, the storage controller 114 may infer the chunk size(s) based on the transactions. Although many suitable examples are described below, it is understood that any suitable algorithm may be used to identify the chunk size of the application.

In an example of one such algorithm, the storage controller 114 or other suitable element first distinguishes those transactions directed to the chunk from amidst the bulk of transactions received from the initiator. In other words, while in the ideal case, the only transactions received by the storage controller 114 from the initiator are part of a burst of transactions that access the data chunk, it is also possible that the storage controller 114 will also receive other transactions from the initiator that may act as background noise.

Accordingly, referring to block 308, the storage controller 114 or other suitable element of the storage system 102 may analyze the transaction log 402 to identify a baseline amount of transaction activity associated with the initiator and the volume at a time when the application is not attempting to access an entire data chunk. FIG. 6 is a plot 600 of a rate at which transactions are received from an initiator over time in an example. In the example of FIG. 6, the pronounced peaks represent accesses of an entire data chunk, while the periods of lower activity are suitable for use as a baseline.

To determine baseline activity for use as a reference, the storage controller 114 or other suitable element of the storage system 102 may analyze the transaction log 402 to identify local minima (as indicated by marker 602) in the rate of transactions received over time. The transaction rates at the local minima may be compared to eliminate statistical outliers with uncharacteristically too many or too few transactions. A window of time surrounding one of the remaining local minima may be selected as the representative baseline window 604.

Referring to block 310, the storage controller 114 or other suitable element may analyze the transaction log 402 to identify a set of transactions that likely constitute an attempt to read, write, or otherwise access an entire data chunk. This type of activity may be characterized by a large number of transactions received within a short window of time, and so to detect this activity, the storage controller may analyze the transaction log 402 to identify local maxima (as indicated by marker 606) in the rate at which transactions are received. The transaction rates at the local maxima may be compared to eliminate statistical outliers with uncharacteristically too many or too few transactions.

Referring to block 312, in order to confirm that the local maxima values correspond to bursts of data transactions directed to a single chunk, the storage controller 114 may compare the amount of time between the local maxima (as indicated by marker 608) to determine whether they occur at approximately regular intervals. Because an application may wait for an entire chunk to be read or written before requesting the next chunk, chunk accesses may be characterized by their periodic nature.

Referring to block 314, the storage controller 114 may also confirm the local maxima by comparing the transaction rate associated with a local maximum to the transaction rate associated with the representative baseline of block 308 to determine whether they are sufficiently different. In such embodiments, the storage controller 114 may eliminate from consideration any local maximum that is not at least some multiplier of the baseline activity (e.g., greater than 1.5×, 2×, 3×, etc. the transaction rate of the baseline). A window of time surrounding one of the remaining local minima may be selected to represent a chunk access 610.

Because, as disclosed above, other transactions may be received concurrently with those transactions directed to the data chunk, the storage system 102 may compare the behavior of the transactions during the chunk access 610 to those in the baseline window 604 in order to identify those directed to the data chunk. In one example, the storage controller 114 or other suitable element may compare logical block address (LBA) shifts for the transactions received during the chunk access 610 to those of the transactions in the baseline window 604, as shown in block 316. Sequential transactions may be characterized by a low LBA shift, while random transactions may be characterized by high LBA shift. Because the transactions of the chunk access 610 can be received in any order, their LBA shifts may more closely resemble random transactions than sequential transactions. Examples of this behavior can be seen in FIGS. 7 and 8. FIG. 7 is a histogram of LBA shift for an exemplary set of transactions during a baseline window 604, and FIG. 8 is a histogram of LBA shift for an exemplary set of transactions during a chunk access 610.

Referring still to block 316 of FIG. 3, the storage controller 114 or other suitable element compares the LBA shifts of the set of transactions during the chunk access 610 to the LBA shifts during the baseline window 604. In some embodiments, the comparison includes the storage controller 114 subtracting the number of occurrences of each LBA shift of the baseline window 604 from the number of occurrences of each LBA shift of the chunk access 610. Additionally or in the alternative, in some embodiments, the comparison includes the storage controller 114 comparing the LBA shifts of the chunk access 610 to some multiple of the LBA shifts of the baseline window 604. The storage controller 114 may infer that LBA shifts exceeding some multiple of the baseline set (e.g., 1.5×, 2×, 3×, etc.) are due to a burst of transactions directed to a single chunk of data.

Having identified those data transactions directed to the chunk of data and their respective LBA shifts, the storage controller 114 or other suitable element determines the chunk size from the LBA shifts, as shown in block 318. Because by definition, a set of transactions directed to a single chunk cannot have LBA shifts greater than the chunk size, the storage controller 114 may examine the burst set for a sharp drop-off in LBA shift (as indicated by marker 802 of FIG. 8, for a maximum. LBA shift, and/or for other indications of a maximum chunk size. In some embodiments, the storage controller 114 compares a chunk size inferred from these attributes against a table of common chunk sizes 406 and their respective applications. For example, the table 406 may indicate that some applications utilize a 64 MB chunk size, and from this, the storage controller 114 can determine that a sudden drop in LBA shifts at around at slightly less than 64 MB is more likely associated with 64 MB chunk than, for example, a 63 MB chunk. Similarly, the storage controller 114 may infer that the occasional LBA shift greater than 64 MB is an outlier that is not associated with the chunk.

Having determined a chunk size associated with an application, the storage system 102 may use this information when accessing the data chunks and when prefetching subsequent chunks. Referring to block 320, the storage controller 114 or other suitable element of the storage system 102 may detect transactions that indicate the start of a subsequent data chunk access. The storage controller 114 may use any suitable technique to determine the start of a data chunk access. For example, the storage controller 114 may compare a rate at which transactions are received from the initiator to a transaction rate associated with the baseline window 604 determined in block 308. A transaction rate that exceeds some multiple of the baseline rate may indicate the start of the data chunk access. The storage controller may detect or confirm that a data chunk access has begun by comparing an interval of time since the last data chunk access. Because chunk accesses may be characterized by their periodic nature, if the interval of time since the last data chunk access is similar to the period between chunk accesses, it may strongly suggest another chunk access is in progress.

Referring to block 322, upon detecting that a data chunk access has begun, the storage system 102 may use chunk information including the determined chunk size to retrieve the data chunk from the storage devices 106 and to cache it more efficiently. This provides a significant and measurable improvement over conventional techniques for responding to data transactions. For example, in some embodiments, the storage system 102 uses the determined chunk size to begin retrieving the data chunk before all of the transactions involved in accessing the chunk have been received. This can be considered prefetching the portions of the chunk with transactions that are still in flight. Furthermore, in some embodiments, the storage system 102 uses the determined chunk size to retrieve the data sequentially from the storage devices 106, which in many applications is faster than retrieving the data randomly based on when the constituent transactions are received.

Referring to block 324, because it has been determined that many applications request data chunks one after the other in a regular order, upon detecting that a data chunk access has begun, the storage system 102 may use the chunk information including the determined chunk size to predict the next data chunk to be accessed. Upon such a determination, the storage controller 114 may prefetch and cache the subsequent data chunk from the storage devices 106 in a sequential manner.

As will be recognized, the method 300 provides an improved data retrieval and prefetching technique based on an application's history of data usage that addresses a technical challenge particular to the division of data transactions into smaller units and the associated loss of context. In some embodiments, a storage system aggregates the smaller, seemingly random transactions into a larger chunk-based transaction, which for some storage media can be accessed much faster because the data can be manipulated sequentially. In some embodiments, a storage system begins to prefetch the entire chunk before all the transactions are received. In some embodiments, a storage system prefetches subsequent chunks in response to transactions directed to a preceding chunk. In these examples and others, the present technique addresses the aforementioned challenges and thereby provides significant improvements over conventional transaction handling.

In various embodiments, the technique is performed by using various combinations of dedicated, fixed-function computing elements and programmable computing elements executing software instructions. Accordingly, it is understood that any of the steps of method 300 may be implemented by a computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a method, a computing device, and a non-transitory machine-readable medium for identifying a set of transactions directed to a contiguous chunk of data, determining the data chunk size from the set of transactions, and for sequentially retrieving data chunks using the data chunk size.

In some embodiments, the method includes receiving, by a storage system, a set of data transactions from an initiator. The storage system identifies a subset of the set of data transactions that is directed to accessing a first chunk of data and determines, from the subset of transactions, a chunk size of the first chunk of data. The storage system sequentially'retrieves a second chunk of data based on the determined chunk size. In some such embodiments, the identifying of the subset includes: identifying a first window of time during which the subset of transactions was not being received; determining a baseline transaction rate during the first window of time; and comparing activity during a second window of time to the baseline transaction rate to determine that the second window of time includes the subset that is directed to accessing the first chunk of data.

In further embodiments, the computing device includes a memory containing machine readable medium comprising machine executable code having stored thereon instructions for performing a method of data prefetching; and a processor coupled to the memory. The processor is configured to execute the machine executable code to cause the processor to: receive a set of data transactions from an initiator; identify a subset within the set of data transactions that is directed to a first data chunk; determine, from the subset, a chunk size of the first data chunk; and sequentially access a second chunk of data based on the determined chunk size. In some such embodiments, the processor is further configured to execute the machine executable code to cause the processor to compare logical block address (LBA) shift amounts during the first window of time to LBA shift amounts during the second window of time in order to further identify the subset that is directed to the first data chunk from within a set of data transactions received during the second window of time.

In yet further embodiments, the non-transitory machine readable medium has stored thereon instructions for performing a method comprising machine executable code which when executed by at least one machine, causes the machine to: receive a set of data transactions from an initiator; identify a subset of data transactions within the set of data transactions that is directed to accessing a first data chunk; determine, from the subset of data transactions, a chunk size of the first data chunk; and retrieve a second chunk of data from one or more storage devices in a sequential manner based on the determined chunk size. In some such embodiments, the instructions to identify the subset of data transactions include further instructions that cause the machine to compare a time interval between local maxima to determine periodic behavior.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving, by a storage system, a set of data transactions from an initiator;
   identifying a subset of the set of data transactions that is directed to accessing a first chunk of data;
   determining, from the subset of the set of data transactions, a chunk size of the first chunk of data, wherein determining the chunk size includes identifying a drop off in a count of logical block address (LBA) shift amounts associated with the subset of the set of data transactions; and
   sequentially retrieving a second chunk of data based on the determined chunk size.

2. The method of claim 1, wherein the identifying of the subset of the set of data transactions includes:
   identifying a first window of time during which the subset of the set of data transactions was not being received;
   determining a baseline transaction rate during the first window of time; and
   comparing activity during a second window of time to the baseline transaction rate to determine that the second window of time includes the subset of the set of data transactions that is directed to accessing the first chunk of data.

3. The method of claim 2, wherein the comparing of the activity includes comparing LBA shift amounts during the first window of time to LBA shift amounts during the second window of time to identify the subset of the set of data transactions directed to accessing the first chunk of data from within a set of data transactions received during the second window of time.

4. The method of claim 2, wherein the identifying of the first window of time includes determining a local minimum in a rate at which transactions are received.

5. The method of claim 2 further comprising identifying the second window of time by determining a local maximum in a rate at which transactions are received.

6. The method of claim 5, wherein the identifying of the second window of time further includes comparing a time interval between local maxima to determine periodic behavior.

7. The method of claim 1, wherein the determining of the chunk size includes:
   determining an upper bound of the LBA shift amounts of the subset of the set of data transactions.

8. The method of claim 1, wherein the sequential retrieving of the second chunk of data is performed prior to receiving an entire set of transactions directed to the second chunk of data.

9. The method of claim 1, wherein the sequential retrieving of the second chunk of data is performed prior to receiving any transaction directed to the second chunk of data.

10. A computing device comprising:
    a non-transitory memory containing machine readable medium comprising machine executable code having stored thereon instructions for performing a method of data prefetching; and
    a processor coupled to the non-transitory memory, the processor configured to execute the machine executable code to cause the processor to:
        receive a set of data transactions from an initiator;
        identify a subset within the set of data transactions that is directed to a first data chunk;
        determine, from the subset, a chunk size of the first data chunk, wherein the determining includes identifying a drop off in a count of logical block address (LBA) shift amounts associated with the subset; and
        sequentially access a second chunk of data based on the determined chunk size.

11. The computing device of claim 10, wherein the processor is further configured to execute the machine executable code to cause the processor to:
    identify a first window of time during which the subset was not received;
    determine a baseline transaction rate during the first window of time; and
    determine that the subset was received during a second window of time by comparing a transaction rate during the second window of time to the baseline transaction rate.

12. The computing device of claim 11, wherein the processor is further configured to execute the machine executable code to cause the processor to:
    compare LBA shift amounts during the first window of time to LBA shift amounts during the second window of time in order to further identify the subset that is directed to the first data chunk from within a set of data transactions received during the second window of time.

13. The computing device of claim 11, wherein the processor is further configured to execute the machine executable code to cause the processor to:
   determine a local minimum in a rate at which transactions are received in order to identify the first window of time.

14. The computing device of claim 11, wherein the processor is further configured to execute the machine executable code to cause the processor to:
   determine a local maximum in a rate at which transactions are received in order to identify the second window of time.

15. A non-transitory machine readable medium having stored thereon instructions for performing a method comprising machine executable code which when executed by at least one machine, causes the machine to:
   receive a set of data transactions from an initiator;
   identify a subset of data transactions within the set of data transactions that is directed to accessing a first data chunk;
   determine, from the subset of data transactions, a chunk size of the first data chunk, the determining including identifying a drop off in a count of logical block address (LBA) shift amounts associated with the subset of data transactions; and
   retrieve a second chunk of data from one or more storage devices in a sequential manner based on the determined chunk size.

16. The non-transitory machine readable medium of claim 15, wherein the instructions to identify the subset of data transactions include instructions that cause the machine to:
   identify a baseline transaction rate based on a local minimum in a transaction rate;
   select a window of time based on a local maximum in the transaction rate; and
   compare a transaction rate associated with the window of time to the baseline transaction rate to determine that the subset of data transactions are within the window of time and that the subset of data transactions is directed to accessing the first data chunk.

17. The non-transitory machine readable medium of claim 16, wherein the instructions to identify the subset of data transactions include further instructions that cause the machine to:
   compare LBA shift amounts associated with the baseline transaction rate to LBA shift amounts associated with the window of time to identify the subset of data transactions.

18. The non-transitory machine readable medium of claim 16, wherein the instructions to identify the subset of data transactions include further instructions that cause the machine to compare a time interval between local maxima to determine periodic behavior.

19. The non-transitory machine readable medium of claim 15, wherein the determining of the chunk size includes comparing the drop off in the count of LBA shift amounts to a table of chunk sizes.

20. The non-transitory machine readable medium of claim 15, wherein the determining of the chunk size includes determining an upper bound of the LBA shift amounts of the subset of data transactions.

* * * * *